United States Patent
Zhao et al.

(10) Patent No.: US 10,607,361 B2
(45) Date of Patent: Mar. 31, 2020

(54) METHOD FOR OBSERVING WILDLIFE POPULATION SIZE THROUGH REMOTE SENSING IMAGERY

(71) Applicant: INSTITUTE OF OCEANOLOGY, CHINESE ACADEMY OF SCIENCES, Shandong (CN)

(72) Inventors: Peng Zhao, Shandong (CN); Hongsheng Yang, Shandong (CN); Jingchun Sun, Shandong (CN); Yi Zhou, Shandong (CN); Tao Zhang, Shandong (CN)

(73) Assignee: INSTITUTE OF OCEANOLOGY CHINESE ACADEMY OF SCIENCES, Shandong (CN)

( * ) Notice: Subject to any disclaimer, the term of this patent is extended or adjusted under 35 U.S.C. 154(b) by 128 days.

(21) Appl. No.: 15/779,638

(22) PCT Filed: Dec. 26, 2016

(86) PCT No.: PCT/CN2016/112024
§ 371 (c)(1),
(2) Date: May 29, 2018

(87) PCT Pub. No.: WO2018/103147
PCT Pub. Date: Jun. 14, 2018

(65) Prior Publication Data
US 2019/0228538 A1    Jul. 25, 2019

(30) Foreign Application Priority Data
Dec. 8, 2016  (CN) .......................... 2016 1 1120357

(51) Int. Cl.
*G06T 7/62*  (2017.01)
*G06T 7/73*  (2017.01)
*G06T 7/90*  (2017.01)

(52) U.S. Cl.
CPC ................. *G06T 7/62* (2017.01); *G06T 7/73* (2017.01); *G06T 7/90* (2017.01); *G06T 2207/10032* (2013.01); *G06T 2207/20104* (2013.01); *G06T 2207/30181* (2013.01); *G06T 2207/30242* (2013.01)

(58) Field of Classification Search
CPC .... G06T 7/62; G06T 7/90; G06T 7/73; G06T 2207/20104; G06T 2207/10032; G06T 2207/30242; G06T 2207/30181
See application file for complete search history.

(56) References Cited

U.S. PATENT DOCUMENTS

2013/0182114 A1    7/2013  Zhang et al.

FOREIGN PATENT DOCUMENTS

| CN | 103235935 A | 8/2013 |
|---|---|---|
| CN | 104851087 A | 8/2015 |
| CN | 105913017 A | 8/2016 |
| CN | 106126920 A | 11/2016 |

OTHER PUBLICATIONS

International Search Report dated Aug. 29, 2017 for International Patent Application No. PCT/CN2016/112024 (3 pages in Chinese with English translation).

*Primary Examiner* — Christopher Wait
(74) *Attorney, Agent, or Firm* — Smith, Gambrell & Russell, LLP.

(57) ABSTRACT

The present invention relates to the field of wildlife protection, and particularly relates to a method for observing wildlife population size through a remote sensing imagery. The method specifically comprises: a proportion of orthogonal projection area of animals in each pixel to pixel area is computed and summed through a linear correlation between a gray value of a remote sensing imagery pixel and a proportion of the orthogonal projection area of individual animals to the pixel area, to obtain the total orthogonal projection area of target animal population; and population size is obtained on the basis of dividing by the orthogonal projection area of animals of measured individual animals, thereby solving the problem that it is difficult to observe the wildlife population size and a distribution pattern at the same time point. In the present invention, a satellite remote sensing imagery is used to observe the animal population to obtain the population size at the same time point, thereby avoiding errors caused by the pasting counting, estimation and other methods and increasing investigation accuracy and reliability. In the present invention, the remote sensing imagery is used to observe the animal population, thereby avoiding disturbance to animal behaviors and destruction to habitats of the wildlife due to short-distance observation of the wildlife, greatly enhancing safety and economy of field observation and realizing higher application value.

6 Claims, No Drawings

METHOD FOR OBSERVING WILDLIFE POPULATION SIZE THROUGH REMOTE SENSING IMAGERY

TECHNICAL FIELD

The present invention relates to the field of wildlife protection, and particularly relates to a method for observing wildlife population size through remote sensing imagery.

BACKGROUND

Population means all individuals of the same species that occupy a certain space for some time. Population size is the sum of the size of individuals in populations, and is the basis of calculating population density, birth rate, mortality, immigration rate and emigration rate. On one hand, observation of wildlife population size is conducive to revealing the changing rule of wildlife populations and providing basic data support for wildlife protection, and on the other hand, is also conducive to analyzing natural and social factors that influence distribution of animal populations and providing necessary basis for protecting and restoring the ecosystems and promoting economic and social sustainable development around habitats.

Observation and counting of the wildlife populations and the population size are mainly conducted through manual physical counting and estimation for a long time. These methods are greatly influenced by experience of observers, generate counting results which are not at the same time point, are difficult to realize observation of hidden individuals and consume a great number of human power, material resources and time in an investigation. These methods may result large errors and low economy efficiency. Maturity and application of high-resolution remote sensing imager provides a new thought for overlooking the wildlife from an orthogonal angle to obtain features of wildlife distribution patterns at the same time point.

SUMMARY

In view of the difficulty of precisely observing the wildlife population size in the prior art as well as the limit of the method for observing the wildlife population size, the present invention provides a method for observing wildlife population size through remote sensing imagery at the same time point precisely.

To achieve the above purpose, the present invention adopts the following technical solution:

A method for observing wildlife population size through remote sensing imagery comprises: computing the proportion of orthogonal projection area of animals in each pixel and summing the proportions basing on the linear correlationship between the gray value of a remote sensing imagery pixel and the proportion of the orthogonal projection area of animal individual in this pixel, to obtain the total orthogonal projection area of focused animal population; and obtaining population size by dividing it by the measured orthogonal projection area of animal individual.

The method specifically comprises the following steps:

(1) selecting the remote sensing imagery with an appropriate resolution according to the measured orthogonal projection area $S_a$ of individual wildlife;

(2) computing the maximum value r of the proportion of the orthogonal projection area of individual animals to a single pixel area $S_0$;

if $a>l$ and $a>w$, then $r=\sigma \times (l \times w)/a^2$;

if $l>a>w$ and $w/a<\sqrt{2}-\frac{1}{2}$, then $r=\sigma \times (2\sqrt{2}aw-2w^2)/a^2$;

if $l>a>w$ and $w/a \geq \sqrt{2}-\frac{1}{2}$, then $r=\sigma \times w/a$;

if $a<l$ and $a<w$, then $r=1$, wherein a is a side length of the pixel (image resolution);
l is the body length of the individual wildlife;
w is the body width of the individual wildlife;
σ is the correction factor and is computed by comparing the measured orthogonal projection area of the individual wildlife with the product of the body length and the body width;

(3) selecting region of interest of wildlife distribution through visual interpretation according to features of habitat types;

(4) counting the brightness background value $V_{min}$ of the interested region;

(5) counting the maximum value $V_{max}$ of a brightness value of an animal image;

(6) computing the proportion of the orthogonal projection of the individual animals to each pixel according to the follow formula:

$$\rho_i = (V_i - V_{min})/(V_{max} - V_{min})$$

wherein $V_i$ is the brightness value of the ith pixel;

(7) computing the total orthogonal projection area of the wildlife population:

$$S_t = r \times S_0 \times \sum_{i=1}^{n} \rho_i$$

(8) computing the wildlife population size:

$$N = S_t / \overline{S}_a$$

wherein $\overline{S}_a$ is an average value of the measured orthogonal projection areas of the wildlife.

In step (1), the standard for selecting the remote sensing imagery with the appropriate resolution is: the orthogonal projection area S of the individual wildlife is greater than or equal to ¼ of the area $S_0$ of a single pixel at a panchromatic wave band or color composite wave band of the remote sensing imagery.

In step (3), wildlife populations in different habitat types are respectively divided into independent region of interest and respectively extracted.

In step (4), the maximum background brightness value $L_{max}$ of the region of interest and the minimum animals' image brightness value $B_{min}$ are counted; if $L_{max}<B_{min}$, then $L_{max}$ is used as the background brightness value $V_{min}$; and if $L_{max}>B_{min}$, then $B_{min}$ is used as the background brightness value $V_{min}$ and noisy points are removed through visual interpretation after the animal image is extracted.

The wildlife is the animal obviously different from surrounding in body colors or body temperature.

The present invention has the following beneficial effects:

1. In the present invention, remote sensing imagery with an appropriate resolution is selected according to the measured orthogonal projection area of the wildlife, so the method is wide in applicability.

2. in the present invention, a non-contact non-interference remote sensing measurement is used to observe the wildlife population; comparing with the traditional manual investigation, the present invention has no disturbance to wildlife population and no destruction to habitats, and is shorter in duration of observation activities, higher in frequency of observation activities and wider in observation scope.

3. In the present invention, the wildlife populations in different habitat types are respectively divided into region of interest, thereby avoiding the influence of a complex background on observation results.

4. In the present invention, size the animal population size is indirectly obtained through the ratio of the total orthogonal projection area of the wildlife population to the measured orthogonal projection area of the individual wildlife, thereby avoiding the difficulty of distinguishing wildlife images due to clumped distribution of population by direct counting.

DETAILED DESCRIPTION

The present invention will be further described below in combination with specific embodiments.

In the present invention, according to the animals obviously different from an surrounding in body colors or body temperature, a proportion of orthogonal projection area of animals in each pixel to pixel area is computed and summed through a linear correlation between a gray value of a remote sensing imagery pixel and a proportion of the orthogonal projection area of individual animals to the pixel area, to obtain the total orthogonal projection area of target animal population; and population size is obtained on the basis of dividing by the orthogonal projection area of animals of measured individual animals, thereby solving the problem that it is difficult to observe the wildlife population size and a distribution pattern at the same time point. In the present invention, a satellite remote sensing imagery is used to observe the animal population to obtain the population size at the same time point, thereby avoiding errors caused by the pasting counting, estimation and other methods and increasing investigation accuracy and reliability. In the present invention, the remote sensing imagery is used to observe the animal population, thereby avoiding disturbance to animal behaviors and destruction to habitats of the wildlife due to short-distance observation of the wildlife, greatly enhancing safety and economy of field observation and realizing higher application value.

Embodiment 1

The size of whooper swan populations in Yuehu Lagoon of Shandong Rongcheng Whooper Swan National Nature Reserve is observed, specifically:

(1) selecting a Geoeye-1 high-resolution remote sensing satellite image with a resolution of 0.5 m according to a measured orthogonal projection area 0.25 m² of individual whooper swan;

(2) obtaining l>a>w and w/a<√2−½ according to an average body length l=82.55±639 cm, an average body width w=38.33±3.59 cm and a resolution a=0.5 m; computing σ (0.77) by comparing the measured orthogonal projection area of the individual animals with the product of the body length and the body width according to $r=\sigma \times (2\sqrt{2}aw-2w^2)/a^2$; and computing a maximum value r=0.76 of the proportion of the orthogonal projection area of individual animals to a single pixel area;

(3) selecting five interested regions with whooper swan distribution through visual interpretation, and dividing whooper swan populations on water surface and beach into independent interested regions and respectively extracting the interested regions;

(4) counting a brightness background value $V_{min}$ of each interested region by using Envi 5.1 remote sensing software; counting a maximum background brightness value $L_{max}$ of the interested regions and an image brightness minimum value $B_{min}$ of the animals; using $L_{max}$ as the background brightness value $V_{min}$ if $L_{max}<B_{min}$; and using $B_{min}$ as the background brightness value $V_{min}$ if $L_{max}>B_{min}$, and removing noisy points through visual interpretation after the animal image is extracted; (see Table 1)

TABLE 1

| Region | Background Threshold | | Swan Threshold | | Selected Threshold | Total Area | Inversion Size | Actual Size |
| --- | --- | --- | --- | --- | --- | --- | --- | --- |
| | $L_{min}$ | $L_{max}$ | $B_{min}$ | $V_{max}$ | $V_{min}$ | $S_1$ | N | |
| Region 1 | 250 | 406 | 426 | 657 | 406 | 1.7746 | 9.34 | 10 |
| Region 2 | 264 | 458 | 468 | 615 | 458 | 2.0729 | 10.91 | 11 |
| Region 3 | 423 | 570 | 648 | 763 | 570 | 3.0343 | 15.97 | 15 |
| Region 4 | 261 | 438 | 464 | 647 | 438 | 2.6391 | 13.89 | 13 |
| Region 5 | 283 | 453 | 474 | 642 | 453 | 2.1033 | 11.07 | 10 |

(5) counting a maximum value $V_{max}$ of a brightness value of a whooper swan image by using Envi 5.1 remote sensing software; (see Table 1)

(6) computing the proportion of the orthogonal projection of the individual animals to each pixel according to $\rho_i=(V_i-V_{min})/(V_{max}-V_{min})$, wherein $V_i$ is the brightness value of the ith pixel;

(7) computing the total orthogonal projection area of the wildlife population according to $$S_t = r \times S_0 \times \sum_{i=1}^{n} \rho_i;$$

(see Table 1)

(8) computing the wildlife population size according to $N=S_t/\overline{S}_a$ (see Table 1), wherein $\overline{S}_a$ is an average value of the measured orthogonal projection areas of the wildlife;

(9) comparing the size of the whooper swan populations obtained through inversion calculation of the remote sensing imagery with measured observation size (see Table 1), to obtain that an average relative error is 6.00±3.22%, so the inversion accuracy is high.

Embodiment 2

The size of flamingo populations in Lake Nakuru National Park of Kenya is observed, specifically:

(1) selecting a Worldview-2 high-resolution remote sensing satellite image with a resolution of 0.5 m according to an estimated orthogonal projection area 0.23 m² of individual flamingos from flamingo data searched from the literature;

(2) obtaining a>l and a>w according to an estimated body length l=48 cm, an average body width w=33 cm and a resolution a=0.5 m of the flamingos; computing σ (0.75) by comparing the measured orthogonal projection area of the individual animals with the product of the body length and the body width according to r=σ×(l×w)/a²; and computing a maximum value r=0.47 of the proportion of the orthogonal projection area of individual animals to a single pixel area;

(3) selecting three interested regions with flamingo distribution in lake region through visual interpretation;

(4) counting a brightness background value $V_{min}$ of each interested region by using Envi 5.1 remote sensing software; counting a maximum background brightness value $L_{max}$ of the interested regions and an image brightness minimum value $B_{min}$ of the animals; using $L_{max}$ as the background brightness value $V_{min}$ if $L_{max}<B_{min}$; and using $B_{min}$ as the background brightness value $V_{min}$ if $L_{max}>B_{min}$, and removing noisy points through visual inter after the animal image is extracted; (see Table 2)

TABLE 2

| Region | Background Threshold | | Flamingo Threshold | | Selected Threshold | Total Area | Inversion Size | |
|---|---|---|---|---|---|---|---|---|
| | $L_{min}$ | $L_{max}$ | $B_{min}$ | $V_{max}$ | $V_{min}$ | $S_1$ | N | Actual Size |
| Region 1 | 256 | 412 | 435 | 599 | 412 | 2.4562 | 10.68 | 10 |
| Region 2 | 265 | 433 | 453 | 641 | 433 | 1.5672 | 6.81 | 7 |
| Region 3 | 251 | 452 | 475 | 632 | 452 | 3.2314 | 14.05 | 16 |

(5) counting a maximum value $V_{max}$ of a brightness value of a flamingo image by using Envi 5.1 remote sensing software; (see Table 2)

(6) computing the proportion of the orthogonal projection of the individual animals to each pixel according to $\rho_i=(V_i-V_{min})/(V_{max}-V_{min})$, wherein $V_i$ is the brightness value of the ith pixel;

(7) computing the total orthogonal projection area of the wildlife population according to $$S_t = r \times S_0 \times \sum_{i=1}^{n} \rho_i;$$

(see Table 2)

(8) computing the wildlife population size according to $N=S_t/\overline{S}_a$ (see Table 2), wherein $\overline{S}_a$ is an average value of the measured orthogonal projection areas of the wildlife;

(9) comparing the size of the flamingo populations obtained through inversion calculation of the remote sensing imagery with measured observation size (see Table 2), to obtain that an average relative error is 7.23±4.75%, so the inversion accuracy is high.

We claim:

1. A method for observing wildlife population size through a remote sensing imagery, comprising: computing a proportion of orthogonal projection area of animals in each pixel to pixel area and summing the proportions through a linear correlation between a gray value of a remote sensing imagery pixel and a proportion of the orthogonal projection area of individual animals to the pixel area, to obtain the total orthogonal projection area of target animal population; and obtaining population size on the basis of dividing by the orthogonal projection area of animals of measured individual animals.

2. The method for observing wildlife population size through the remote sensing imagery according to claim 1, wherein the method comprises the following steps:

(1) selecting a remote sensing imagery with an appropriate resolution according to the measured orthogonal projection area $S_a$ of individual wildlife;

(2) computing a maximum value r of the proportion of the orthogonal projection area of individual animals to a single pixel area $S_0$;

if $a>l$ and $a>w$, then $r=\sigma\times(l\times w)/a^2$;

if $l>a>w$ and $w/a<\sqrt{2}-\frac{1}{2}$, then $r=\sigma\times(2\sqrt{2}aw-2w^2)/a^2$;

if $l>a>w$ and $w/a\geq\sqrt{2}-\frac{1}{2}$, then $r=\sigma\times w/a$;

if $a<l$ and $a<w$, then $r=1$, wherein a is a side length of the pixel (image resolution);
l is the body length of the individual wildlife;
w is the body width of the individual wildlife;
σ is a correction factor and is computed by comparing the measured orthogonal projection area of the individual wildlife with the product of the body length and the body width;

(3) selecting interested regions with wildlife distribution through visual interpretation according to features of habitat types;

(4) counting a brightness background value $V_{min}$ of the interested region;

(5) counting a maximum value $V_{max}$ of a brightness value of an animal image;

(6) computing the proportion of the orthogonal projection of the individual animals to each pixel according to the follow formula:

$\rho_i=(V_i-V_{min})/(V_{max}-V_{min})$ wherein $V_i$ is the brightness value of the ith pixel;

(7) computing the total orthogonal projection area of the wildlife population:

$$S_t = r \times S_0 \times \sum_{i=1}^{n} \rho_i$$

(8) computing the wildlife population size:

$N=S_t/\overline{S}_a$ wherein $\overline{S}_a$ is an average value of the measured orthogonal projection areas of the wildlife.

3. The method for observing wildlife population size through the remote sensing imagery according to claim 2, wherein in step (1), a standard for selecting the remote sensing imagery with the appropriate resolution is: the orthogonal projection area S of the individual wildlife is greater than or equal to ¼ of the area $S_0$ of a single pixel at a panchromatic wave hand or color composite wave hand of the remote sensing imagery.

4. The method for observing wildlife population size through the remote sensing imagery according to claim 2, wherein in step (3) wildlife populations in different habitat types are respectively divided into independent interested regions and respectively extracted.

5. The method for observing wildlife population size through the remote sensing imagery according to claim 2, wherein in step (4), a maximum background brightness value $L_{max}$ of the interested regions and an image brightness minimum value $B_{min}$ of the animals are counted; if $L_{max} < B_{min}$, then $L_{max}$ is used as the background brightness value $V_{min}$; and if $L_{max} > B_{min}$, then $B_{min}$ is used as the background brightness value $V_{min}$ and noisy points are removed through visual interpretation after the animal image is extracted.

6. The method for observing wildlife population size through the remote sensing imagery according to claim 1, wherein the wildlife is the animal obviously different from an environment in body colors or body temperature.

\* \* \* \* \*